(12) United States Patent
Shim et al.

(10) Patent No.: US 8,848,060 B2
(45) Date of Patent: Sep. 30, 2014

(54) SYNTHETIC INFRARED IMAGE INJECTION APPARATUS

(75) Inventors: Hyung Sik Shim, Daejeon (KR); Kyoung Hwan Oh, Daejeon (KR); Hyun Ki Min, Chungju-si (KR)

(73) Assignee: Olzetek Co., Ltd., Daejeon (KR)

( * ) Notice: Subject to any disclaimer, the term of this patent is extended or adjusted under 35 U.S.C. 154(b) by 135 days.

(21) Appl. No.: 13/204,900

(22) Filed: Aug. 8, 2011

(65) Prior Publication Data
US 2013/0002881 A1 Jan. 3, 2013

(30) Foreign Application Priority Data
Jun. 29, 2011 (KR) .......................... 10-2011-0063802

(51) Int. Cl.
*H04N 5/33* (2006.01)
(52) U.S. Cl.
CPC ...................................... *H04N 5/33* (2013.01)
USPC ......................................................... 348/164
(58) Field of Classification Search
CPC ....................................................... H04N 5/33
USPC ................................................. 348/164, 117
See application file for complete search history.

(56) References Cited

U.S. PATENT DOCUMENTS

| 4,208,810 | A | * | 6/1980 | Rohner et al. ................... 434/43 |
| 5,224,860 | A | * | 7/1993 | Waldman et al. ............... 434/21 |
| 5,343,558 | A | * | 8/1994 | Akeley .......................... 345/426 |
| 5,495,562 | A | * | 2/1996 | Denney et al. ................ 345/421 |

OTHER PUBLICATIONS

Michael Potmesil, Indranil Chakravarty, A lens and aperture camera model for synthetic image generation, Aug. 1981, Computer Graphics, vol. 15, No. 3, pp. 297-305.*

* cited by examiner

*Primary Examiner* — Dave Czekaj
*Assistant Examiner* — Berteau Joisil
(74) *Attorney, Agent, or Firm* — IPLA P.A.; James E. Bame

(57) ABSTRACT

A synthetic infrared image injection apparatus for simulating images obtained from an electron optics head and injecting them into a signal process part so as to evaluate the performance of an infrared image seeker. The synthetic infrared image injection apparatus comprises: an image input module for receiving the images from a channel synthetic image generation apparatus and extracting an effective area from the received images; a first pixel process module for performing an image process so as to reflect elements influenced by model characteristic effects of the electron optics head in the images; a second pixel process module for realizing dead and hot pixels and an automatic gain; an image transmitting and receiving module for outputting processing images of each module and real-time images before the output thereof formed at least one module among each module; and a system control module for diagnosing and controlling operations of each module.

3 Claims, 3 Drawing Sheets

SYNTHETIC INFRARED IMAGE INJECTION APPARATUS

CROSS REFERENCES

Applicant claims foreign priority under Paris Convention and 35 U.S.C. §119 to Korean Patent Application No. 10-2011-0063802, filed Jun. 29, 2011, with the Korean Intellectual Property Office, where the entire contents are incorporated herein by reference.

BACKGROUND OF THE INVENTION

1. Field of the Invention

The present invention relates to a synthetic infrared image injection apparatus and more particularly to a synthetic infrared image injection apparatus in that it considers environments similar to actual operating environments of an infrared sensor, so that a blurring and a noise generated by the electron optical characteristic of the infrared sensor are simulated, thereby injecting infrared images in a sensor signal process part in real time.

2. Description of the Prior Art

Generally, in a simulation technique for realizing infrared images in real time, it involves an infrared simulated image generation technique considering various environments similar to actual operating environments of an infrared sensor. There is a system in that a blurring and a noise generated by the electron optical characteristic of the infrared sensor (seeker) itself are simulated, thereby injecting infrared images in a sensor signal process part in real time.

In the simulation technique for realizing the infrared images in real time, the generation of the infrared images, a real-time realization of the simulation of the infrared sensor based on the generation of the infrared images, and the synchronization thereof are essential.

In order to realistically simulate the infrared images, the characteristic of the physical foundations should be realistically realized. The images of a visible ray spectrum are realized as a light intensity, not the expressions of colors. That is, since the infrared are expressed as the light intensity by detecting the amount of radiation according to the temperature of the material through the infrared sensor, it can be realized as black and white images having no color. In order to generate the infrared images having the above characteristics, it is necessary to calculate the amount of radiation through the temperature calculation of the geography and material based on the physical foundations considering the surrounding environment and the material characteristics.

In order to realistically simulate the infrared sensor, the amount of radiation irradiated in the infrared image sensor is radially calculated by using the scattering from the atmosphere and the amount of radiation irradiated from the component particles, so that the infrared images are generated in real time.

An Electro-Optic Head simulation technique for realizing final infrared images, in that the blurring and noise etc. of the images are applied to the detector through the passage of the infrared electron optical sensor, is essential for the infrared images generated in real time through the infrared image generation apparatus. It is necessary for the Electro-Optic Head simulation to realize the phenomenon generated in the sensor hardware through a modeling procedure in real time. Since it takes a long time to realize this procedure through a software manner on account of a process procedure, it cannot guarantee the real-time processing. Accordingly, it is necessary to guarantee the real-time processing through a hardware manner for realistic real-time simulation thereof.

SUMMARY OF THE INVENTION

Accordingly, the present invention has been made to solve the above-mentioned problems occurring in the prior art, and an object of the present invention is to provide a synthetic infrared image injection apparatus capable of accurately realizing a phenomenon generated in a sensor hardware through a modeling procedure in real time.

To accomplish the object, the present invention provides a synthetic infrared image injection apparatus for simulating images obtained from an electron optics head and injecting them into a signal process part so as to evaluate the performance of an infrared image seeker comprising: an image input module for receiving the images from a channel synthetic image generation apparatus and extracting an effective area from the received images; a first pixel process module for performing an image process so as to reflect elements influenced by model characteristic effects of the electron optics head in the images; a second pixel process module for realizing dead and hot pixels and an automatic gain; an image transmitting and receiving module for outputting processing images of each module and real-time images before the output thereof formed at least one module among each module; and a system control module for diagnosing and controlling operations of each module.

Preferably, the synthetic infrared image injection apparatus further comprises a control and storage apparatus for performing an operator control, an electron optics head modeling, a simulation mode/parameter value setting, a storage of images received from the image transmitting and receiving module, and processing function of the stored images and the images obtained from outside.

Preferably, the image input module comprises: an image input part for receiving the images from the channel synthetic image generation apparatus; a cropping part for extracting only the effective area from the images; a confirmation image output part for outputting the cropped images through a monitor for confirmation; and an image output part for outputting the cropped images to the rear module.

Preferably, the first pixel process module comprises: a window heating process part for adding a heating irradiance, which is due to a temperature rise of the electron optics head, to a target irradiance; a system blurring process part for simulating an image deterioration owing to the characteristic of the electron optics head; and a noise process part for simulating noises of the electron optics head.

Preferably, an irradiation value table by hour of a window of the electron optics head, which is calculated by applying the temperature value according to a flight time of the window, is uploaded to a FPGA memory and then, the window heating process part serves to add the window irradiation to the target image irradiation, thereby performing the window heating process.

Preferably, the second pixel process module comprises: a dead and hot pixel modeling part for realizing a dead pixel and a hot pixel based on the pre-set criteria; an automatic gain control part for improve a distinction of the target and the background by increasing a contrast of the received images; and a saturation process part for processing a saturation effect of a visible ray sensor.

Preferably, a nonlinear responsive function derived from the image samples by shutter speed of the electron optics head is uploaded to a FPGA memory and the saturation process part serves to process the saturation effect in real time by multiplying the responsive function by the luminance of each pixel in the FPGA.

Preferably, the second pixel process module serves to receive the images, which are 15~25% larger than the optical viewing angle of the electron optics head from the channel synthetic image generation apparatus and perform X and Y coordinate transformation and rotation angle transformation in real time in accordance with a frame sync of the signal process part according to a line of sigh transformation by using an Affine Transformation.

BRIEF DESCRIPTION OF THE DRAWINGS

The above as well as the other objects, features and advantages of the present invention will be more apparent from the following detailed description taken in conjunction with the accompanying drawings, in which.

DETAILED DESCRIPTION OF THE EXEMPLARY EMBODIMENTS

Hereinafter, preferred embodiments of the present invention will be described with reference to the accompanying drawings. In the present invention, a dual channel synthetic image injection apparatus for simultaneously processing a visible ray image and an infrared ray image will be adumbratively described. However, it goes without saying that a technique for injecting only a synthetic infrared image also, belongs to the category of the present invention.

Figure 1:
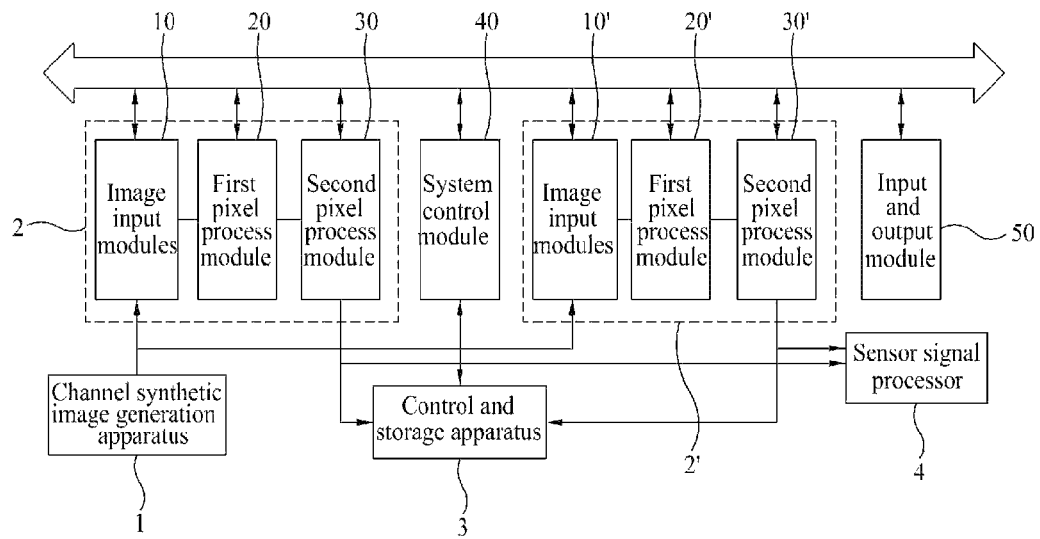
FIG. 1 is an entire block diagram illustrating a synthetic infrared image injection apparatus according to the present invention.

FIG. 1 is an entire block diagram illustrating a synthetic infrared image injection apparatus according to the present invention.

As shown in FIG. 1, the synthetic infrared image injection apparatus according to the present invention includes a channel synthetic image generation apparatus 1, a synthetic infrared image injection apparatus 2, a control and storage apparatus 3, and a sensor signal processor 4.

The channel synthetic image generation apparatus 1 serves to calculate an infrared radiation of a pixel unit per each frame from information on a relative position of an infrared seeker/target, a vision angle, and a position/direction of a sensor based on three dimensional and infrared database composed of infrared characteristic materials considering predefined shape, material, construction, heat transfer, and weather conditions etc. according to environmental conditions such as atmospheric effects, field effects, and EOCM and so on and then, generate any image having a given resolution based on it.

An infrared image generation software serves to radiatively render exact image signals in real time during simulating flight test of a guided missile having an infrared seeker. Also, the infrared image generation software serves to generate a dynamic image signal within an infrared bandwidth inputted in an electron optics head of the infrared seeker according to a mutual operation scenario between the target and the guided missile. Here, the dynamic image signal is composed of a sun, a sky, targets, a topography, and atmospheric effects in terms of solid geometry in a state of hostilities. Also, the dynamic image signal is calculated by pixel unit per each frame.

The channel synthetic image generation apparatus 1 serves to generate two synthetic images, that is, the visible ray image and the infrared ray image by means of the dual channel manner.

The synthetic infrared image injection apparatus serves to receive the infrared ray synthetic image signals and the visible ray synthetic image signals from the channel synthetic image generation apparatus 1, calculate the characteristic model of the sensor head unit of the infrared seeker in real time, and inject the calculated image signals into the sensor signal processor 4 in a real output form.

The synthetic infrared image injection apparatus includes an infrared channel process part 2, a visible ray channel process part 2', a system control module 40, an input and output module 50, and a control and storage apparatus 3.

The infrared channel process part 2 and the visible ray channel process part 2' include image input modules 10 and 10' for individually receiving synthetic infrared and visible ray images of a dual link DVI type from the channel synthetic image generation apparatus 1, first pixel process modules 20 and 20' for performing an image process so as to reflect elements influenced by the model characteristic effects of the electron optics head in the image, processing the image blurring owing to a window heating and the model characteristic effects of the electron optics head, and processing various noises owing to a pixel characteristic of the detector, and second pixel process modules 30 and 30' for realizing dead and hot pixels, an automatic gain, and an element saturation, respectively.

Since each module of the infrared channel process part 2 is actually the same as those of the visible ray channel process part 2' except the process wavelength range, only the infrared channel process part 2 will be illustrated by example. The concrete description on this will be explained in FIG. 2 through FIG. 4.

Here, an image transmitting and receiving module (not shown) for controlling the processing images of each module and the real-time images before the output thereof and outputting them to the control and storage apparatus 3 is formed at least one module of the infrared channel process part 2 and the visible ray channel process part 2'.

The system control module 40 serves to diagnose and control the operations of each module of the infrared channel process part 2 and the visible ray channel process part 2'.

The input and output module 50 serves to input/output the data from/to the outside through a system bus.

The control and storage apparatus 3 serves to perform an operator control, an electron optics head modeling, a simulation mode/parameter value setting, a storage of images received from the image transmitting and receiving module, and processing function of the stored images and the images obtained from outside.

Figure 2:
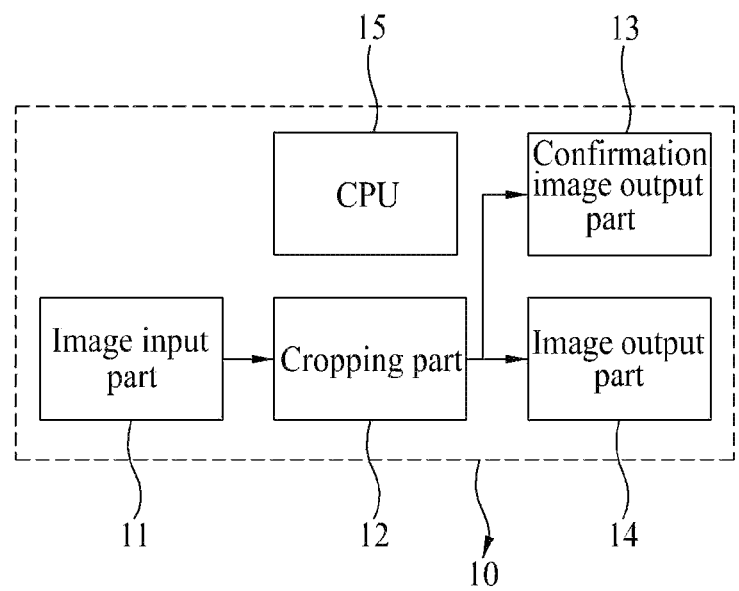
FIG. 2 is a block diagram illustrating the image input modules of FIG. 1.

FIG. 2 is a block diagram illustrating the image input modules of FIG. 1.

As shown in FIG. 2, the image input module includes an image input part 11, a cropping part 12, a confirmation image output part 13, an image output part 14, and a CPU 15.

The image input part 11 serves to receive the images from the channel synthetic image generation apparatus 1. That is, the image input part 11 receives dual link digital DVI images of 1,024×768 or 800×600 more than 250 Hz.

The cropping part 12 serves to extract only an effective area from the images and decrease a clock speed to improve a stability of the system process. Here, in a case that the data is stored in the memory of a FIFO manner, it utilizes the inputted clock. Meanwhile, during data reading, it utilizes a clock of a low frequency.

The confirmation image output part 13 serves to confirm intermediate process results through a small monitor (not shown). That is, the confirmation image output part 13 serves to convert the images at a resolution of 640×480 or 480×640, and convert them into analog signals through a D/A convertor, and then, transmit the images to the small monitor through a VGA cable.

The image output part 14 serves to transmit the cropped images to the first pixel process module 20 and the CPU 15 serves to control the operation of each element.

Figure 3:
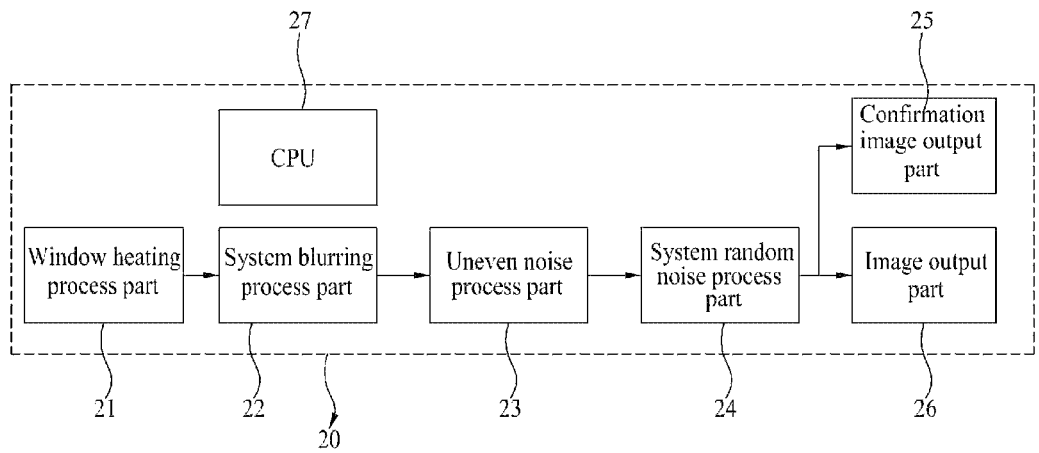
FIG. 3 is a block diagram illustrating the first pixel process module of FIG. 1.

FIG. 3 is a block diagram illustrating the first pixel process module of FIG. 1.

As shown in FIG. 3, the first pixel process module 20 includes a window heating process part 21, a system blurring process part 22, an uneven noise process part 23, a system random noise process part 24, a confirmation image process part 25, an image output part 26, and a CPU 27.

The window heating process part 21 serves to add a heating irradiance, which is due to a temperature rise of the electron optics head, to a target irradiance. During the initial flight of the guided missile, the seeker window is sharply heated by the high speed flight thereof. The rate of increase and the size in temperature are influenced by an altitude, a speed, and an attack angle of the guided missile and a shape of the window. Here, since the temperature heating of this window is effected by another infrared heating source, a background radiation is added to the infrared detection of the seeker, thereby it brings about a result in that the background radiation is added to the amount of irradiation obtained from the target. Accordingly, it can be a drawback for the target detection function of the seeker.

Supposing the heated seeker window is satisfied with the Blackbody radiation and the Lambert's law, the irradiance per pixel on the axis of the seeker is given as follows.

$$M_W = \frac{A_d}{4}\left(\frac{D_W}{d}\right)\int_{\lambda_1}^{\lambda_2} \varepsilon_W(T_W, \lambda, x_W) M_\lambda(T_W) d\lambda \quad \text{Equation 1}$$

here, $A_d$: detector's pixel area $D_W$: effective window distance $d$: window to detector distance $x_W$: window thickness $\varepsilon_W(T_W, \lambda, x_W)$: window emittance $M_\lambda(T_W)$: energy per unit wavelength (the spectral irradiance in $W \cdot m^{-2} \cdot \mu m^{-1}$)

$$M_\lambda = \frac{2\pi hc^2}{\lambda^5}\frac{1}{e^{hc/\lambda kT_W}-1}$$

$\lambda$: the wavelength, $h$: Planck constant $(6.6262 \times 10^{-34} W\text{-}s^2)$ $T_W$: absolute window temperature $C$: velocity of light $k$: Boltzmann's constant $(1.381 \times 10^{-23} W\text{-}s/K)$.

From the above equation 1, it can be seen that the background radiation of the detector is overlapped with the irradiance (Mt) of the target, which is inputted from the synthetic image generation apparatus. Accordingly, the total irradiation come to the detector is Mw+Mt.

Here, the irradiation value table by hour of the window, which is calculated by applying the temperature value according to the flight time of the window, is uploaded to the FPGA memory and then, the window heating process part 21 serves to add the window irradiation to the target image irradiation, thereby performing the window heating process.

The system blurring process part 22 serves to simulate an image deterioration owing to the characteristic of the electron optics head. That is, the system blurring process part 22 serves to divide an optical part, a detector, an electron circuit part, and a gimbal part through an analysis model, model them, and then, extract and apply a convolution kernel after the generation of a MTF (Modulation Transfer Function) and a PSF (Point Spread Function).

In the MTF (Modulation Transfer Function) illustrating the performance of each part, it can find the values of the convolution kernel coefficient through a theoretical calculation or an input of the experimental value based on a widely used mathematical modeling equation. Here, after the values of the convolution kernel coefficient are processed in a control computer through an off-line, the values of the convolution kernel coefficient are loaded on the FPGA memory to be processed during processing thereof in real time.

The uneven noise process part 23 serves to virtually process the uneven noise. The uneven noise is generated by a nonlinear reactivity of the detector by each pixel element and nonuniformity thereof. Also, it is called as a spatial noise, which is constantly generated between frames (frame-to-frame).

The uneven noise takes the form of addition or multiplication. The noise affected by the dark current is expressed as the form of addition. Meanwhile, the noise affected by the signal level is expressed as the form of multiplication.

The system random noise process part 24 serves to copy the system random noise of the infrared sensor. Here, the system random noise is expressed as a NEDT (Noise Equivalent Differential Temperature). Also, when a SNR (signal to noise ratio) is 1, the NEDT is expressed as a temperature difference for generating output signals having the same size as the noise at a background temperature and a figure of merit for generating noises of the infrared sensor. Here, the system random noise is calculated by the following equation 2.

$$NEDT = \frac{4 \cdot F\#^2 \sqrt{\Delta f}}{\sqrt{A_d} \int_{\lambda_1}^{\lambda_2} \tau_{optics}(\lambda) \frac{\partial M_e(\lambda, T_B)}{\partial T} D^*(\lambda) d\lambda} \quad \text{Equation 2}$$

here, $\Delta f = \frac{1}{2t_{int}}$ $F\#$: $F$-number $A_d$: Detector Area $\tau_{optics}$: Optical Transmittance $D^*(\lambda)$: Detectivity $M_e(\lambda, T) =$ $\frac{3.7418 \times 10^4}{\lambda^5}\frac{1}{\exp(14388/\lambda T)-1}[W\ cm^{-2}\mu m^{-1}]$;

Planck's Blackbody Spectral Radiant Exitance.

Since the functions of the confirmation image process part 25, the image output part 26, and the CPU 27 are the same as those of the image input modules 10, further descriptions on those are omitted here.

Figure 4:
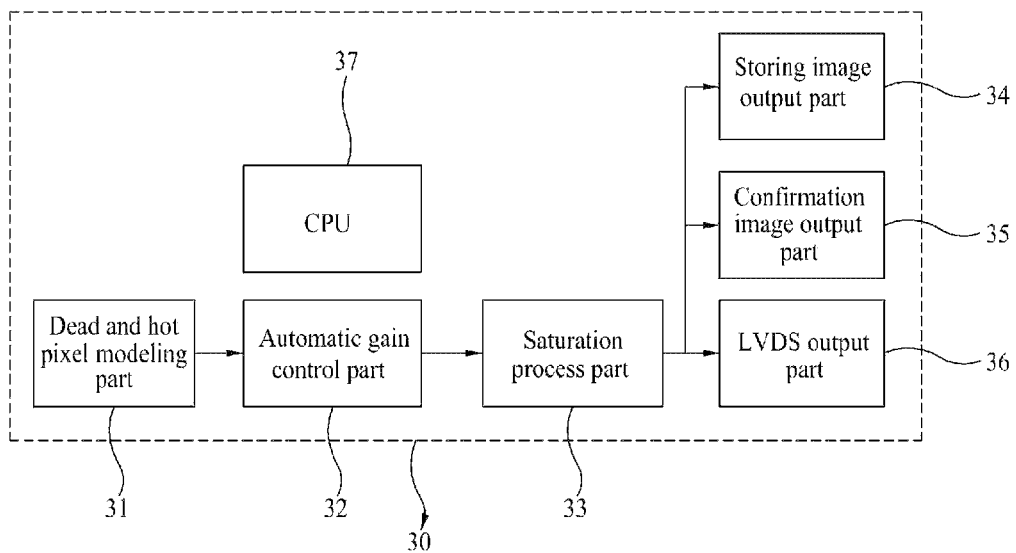
FIG. 4 is a block diagram illustrating the second pixel process module of FIG. 1.

FIG. 4 is a block diagram illustrating the second pixel process module of FIG. 1.

As shown in FIG. 4, the second pixel process module 30 includes a dead and hot pixel modeling part 31, an automatic gain control part 32, a saturation process part 33, a storing image output part 34, a confirmation image output part 35, a LVDS output part 36, and a CPU 37.

The dead and hot pixel modeling part 31 serves to realize a dead pixel and a hot pixel based on the pre-set criteria. Here, the dead/hot pixels are processed with fixed values. That is, the dead pixel for generating a very low output owing to a remarkably low sense responsivity is processed with "0" and the hot pixel has a value over ten times of the dark current. In order to easily set the dead pixel and the hot pixel, it is preferred that they are set to any one of 640×480 and 480×640 by a user. Also, in order to realize it in real time, the dead pixel and the hot pixel are uploaded to a memory of the dead and hot pixel modeling part 31 to be processed and realized.

The automatic gain control part 32 serves to apply and realize an AGG (Auto-gain Controller) so as to improve a distinction of the target and the background by increasing a contrast of the received images.

Figure 5:
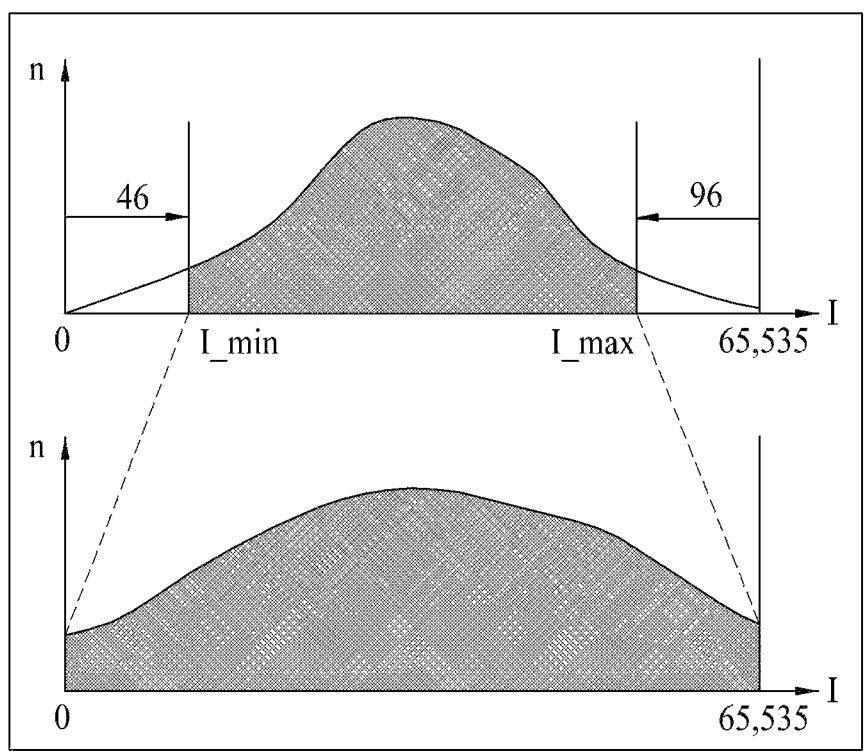
FIG. 5 is an exampling view illustrating a control principle of an automatic sense gain using a histogram manner.

In the present embodiment, the automatic gain can be controlled through a histogram manner. That is, as shown in FIG. 5, the upper and lower part excluded from the histogram distribution within the area on interest (AOI) is set to a given percent (%), so that the pixel values of the excluded part is extended in the distribution of 0~65,535.

The saturation process part 33 serves to process a saturation effect of the visible ray sensor. In the typical image system, the irradiance come to the optical detector is expressed as the following equation 3.

$$E = L\frac{\pi}{4}\left(\frac{A_a}{F\#^2}\right)\cos^4\theta.$$ Equation 3

Here, L is an irradiance, Ad is a detecting area, F# is a number of F, and θ is an angle between a main ray and an optical axis.

When the incident irradiance is constant, the pixel values of the photographed image are varied according to a shutter speed and a size of the aperture on the same background and condition. Accordingly, in an ideal optical system, the intensity of radiation (I) is proportion to the irradiance and the exposure time, that is, the shooting time Δt. That is, the intensity of radiation (I) per the detector pixel is expressed as the following equation 4.

$$I = E \cdot \Delta t$$ Equation 4.

When the irradiance is constant, since the intensity of radiation (I) is proportion to the exposure time, that is, the shutter speed, the pixel values are varied. However, in the real optical system, the relation between the intensity of radiation (I) measured per the detector pixel and the exposure time is not linear but nonlinear. Accordingly, the values per the pixel measured from the real images are expressed as the following equation 5.

$$Z = f(E \cdot \Delta t)$$ Equation 5.

That is, the measured digital values per the pixel are corresponded to the irradiance by means of the function (f). If it can find out a reversed function thereof, the change of the intensity of radiation is predictable according to the exposure time (shutter speed). In order to find out the reversed function thereof, the above equation 5 can be expressed as the following equation 6.

$$\ln f^{-1}(Z) = \ln E + \ln \Delta t$$ Equation 6.

Here, the nonlinear responsive function derived from the image samples by shutter speed of the electron optics head is uploaded to the FPGA memory. The saturation process part 33 serves to process the saturation effect in real time by multiplying the responsive function by the luminance of each pixel in the FPGA.

The storing image output part 34 serves to transmit the images for storing to the control and storing apparatus 3. Since the functions of the confirmation image output part 35, the LVDS output part 36, and the CPU 37 are the same as those of the first pixel process part 20, further descriptions on those are omitted here.

In order to compensate the transfer delay generated between the channel synthetic image generation apparatus 1 and the sensor signal processor 4 for processing the guided missile model, the second pixel process module 30 serves to receive the images, which are 15~25% larger than the optical viewing angle of the electron optics head, from the channel synthetic image generation apparatus 1 and perform X and Y coordinate transformation and rotation angle transformation in real time in accordance with a frame sync of the signal process part according to a transformation of a sight and a sight rotation angle by using an Affine Transformation.

While this invention has been described in connection with what are presently considered to be the most practical and preferred embodiments, it is to be understood that the invention is not limited to the disclosed embodiments and the drawings, but, on the contrary, it is intended to cover various modifications and variations within the spirit and scope of the appended claims.

What is claimed is:

1. A synthetic infrared image injection apparatus for simulating an electro-optic head and injecting its simulated images into a signal process part so as to evaluate the performance of an infrared image seeker comprising:
    an image input module for receiving the images from a channel synthetic image generation apparatus and extracting an effective area from the received images;
    a first pixel process module for performing an image process so as to simulate characteristic effect of electro-optic head model in the images and comprising a window heating process part for adding a heating irradiance, which is due to a temperature rise of the electron optics head, to a target irradiance; a system blurring process part for simulating an image deterioration owing to the characteristic of the electron optics head; and a noise process part for simulating noises of the electro-optic head; and
    a second pixel process module for realizing dead and hot pixels and an automatic gain comprising: a dead and hot pixel modeling part for realizing a dead pixel and a hot pixel based on the pre-set criteria; an automatic gain control part for improving a distinction of the target and the background by increasing a contrast of the received images; and a saturation process part for processing a saturation effect of a visible ray sensor,
    wherein an irradiation value table by hour of a window of the electro-optic head, which is calculated by applying the temperature value according to a flight time of the window, is uploaded to a FPGA memory and then, the window heating process part serves to add the window irradiation to the target image irradiation, thereby performing the window heating process, and the second pixel process module serves to receive the images, which are 15~25% larger than the optical viewing angle of the electron optics head, from the channel synthetic image generation apparatus and perform X and Y coordinate transformation and rotation angle transformation in real time in accordance with a frame sync of the signal process part according to a transformation of a sight and a sight rotation angle by using an Affine Transformation.

2. A synthetic infrared image injection apparatus as claimed in claim 1, wherein the image input module comprises:
- an image input part for receiving the images from the channel synthetic image generation apparatus;
- a cropping part for extracting only the effective area from the images;
- a confirmation image output part for outputting the cropped images through a monitor for confirmation; and
- an image output part for outputting the cropped images to the rear module.

3. A synthetic infrared image injection apparatus as claimed in claim 2, wherein a nonlinear responsive function derived from the image samples by shutter speed of the electron optics head is uploaded to a FPGA memory and the saturation process part serves to process the saturation effect in real time by multiplying the responsive function by the luminance of each pixel in the FPGA.

\* \* \* \* \*